UNITED STATES PATENT OFFICE.

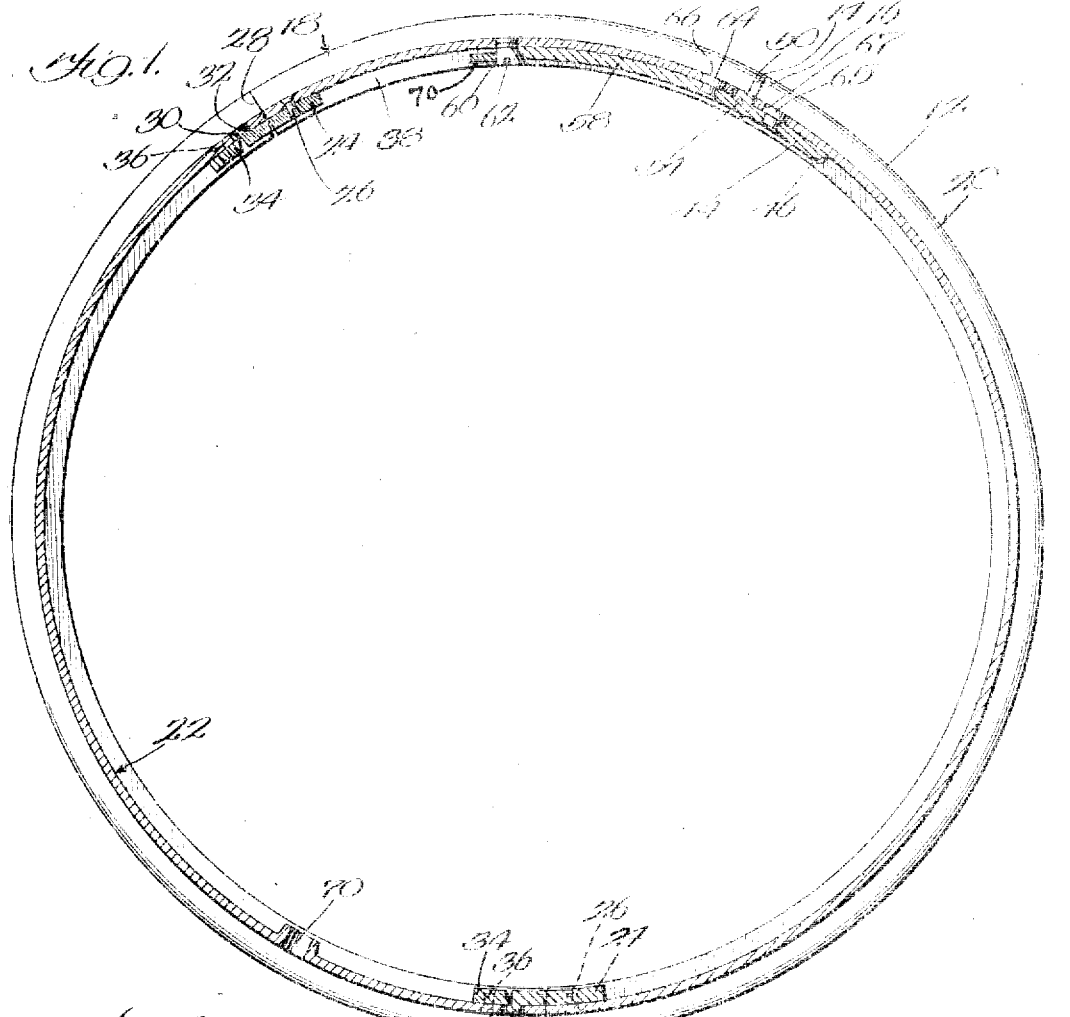
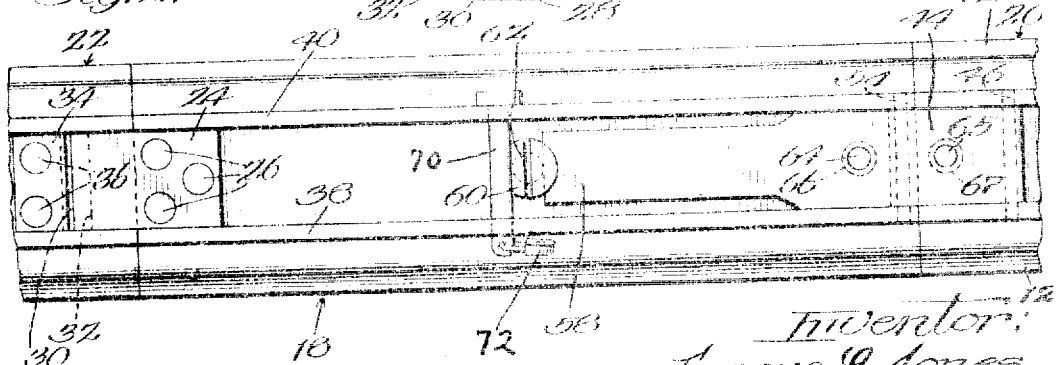

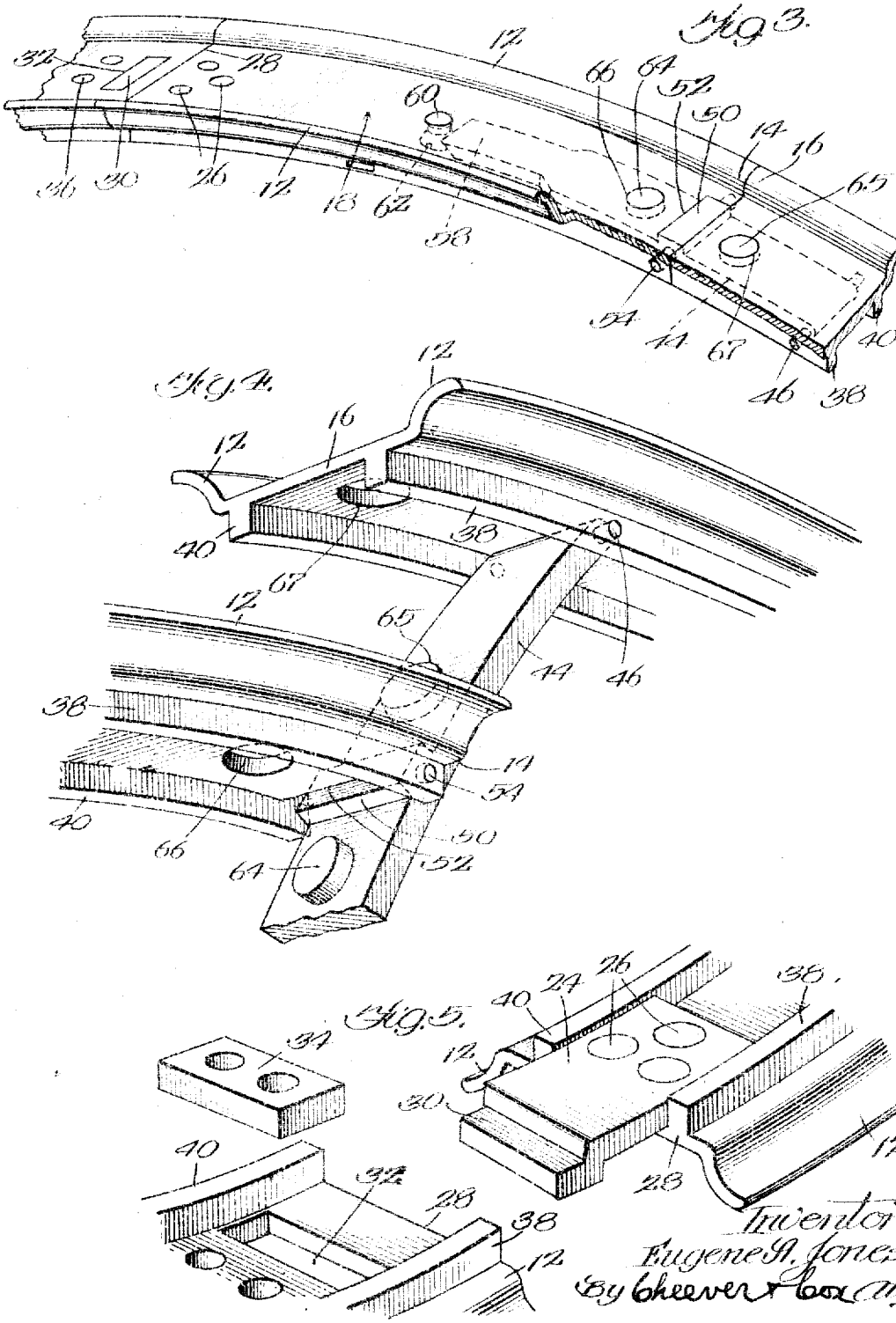

EUGENE A. JONES, OF LOS ANGELES, CALIFORNIA.

COLLAPSIBLE RIM FOR WHEELS.

1,374,574.  Specification of Letters Patent.  Patented Apr. 12, 1921.

Application filed June 21, 1919. Serial No. 305,938.

*To all whom it may concern:*

Be it known that I, EUGENE A. JONES, a citizen of the United States, residing at Los Angeles, in the county of Los Angeles and State of California, have invented a certain new and useful Improvement in Collapsible Rims for Wheels, of which the following is a specification.

This invention relates to that class of tire rims, tire supports, commonly known as collapsible demountable rims which are commonly used to carry previously inflated pneumatic tires so that they can be readily applied to and removed from the wheel proper of the vehicle such as an automobile, without it being necessary to go through the manipulation of inflating the tire at the roadside or other point at which and when it is necessary to change the tire.

More particularly the invention relates to the class of collapsible tire rims having two oppositely disposed, normally abutting end sections capable of moving one past the other in combination with an operating lever more or less permanently pivoted to each of such adjacent end sections of the rim at different distances from such end. The invention further relates to a hinge construction for connecting two other abutting sections of the rim to facilitate such passing.

The objects of the invention are to provide a form of lever mechanism for manipulating the end sections of the rim which pass each other, adapted for ready application to commercial rims in use and so constructed as to hold the adjacent rim sections rigidly in locked position when the tire is applied in working position, and to provide a hinge construction coöperating in this.

The invention consists of mechanism capable of carrying out the foregoing objects which can be easily and conveniently made, which are satisfactory in operation and not readily liable to get out of order. More particularly the invention consists in the features and details of construction hereinafter more fully set forth in the specification and claims.

Referring to the drawings in which like numerals represent the same parts throughout the several views, Figure 1 is a side view partially in section of a rim illustrating this invention in its preferred form.

Fig. 2 is an inverted plan view of the upper portion of Fig. 1, illustrating both the lever mechanism and the hinge mechanism in normal position; i. e., when the tire, not shown, is supposed to be applied to the rim.

Fig. 3 is a perspective view of the parts shown in Fig. 2, taken from above and one side of the rim.

Fig. 4 is a perspective view of the lever mechanism in the position which it assumes when the rim is being collapsed.

Fig. 5 is a perspective view of the hinge parts separated one from the other.

In carrying out this invention the metallic supporting rim having the customary side flanges 12, is provided the same being severed transversely at least at one point so that there are two ends 14 and 16 abutting each other in normal position shown in Figs. 1, 2 and 3, and passing each other somewhat when the rim is collapsed as shown in perspective in Fig. 4. If the rim proper is made of very resilient material to bend circumferentially so that the ends 14 and 16 can move from the normal position of Fig. 3 to that of Fig. 4, it is unnecessary to sever the rim at any other point, but in ordinary rim practice, rims are not made of such exceedingly resilient material and the device is therefore shown herein as applied to a rim, cut in three segments or parts 18, 20 and 22, sections 18 and 22 being hinged together and sections 20 and 22 being hinged together so as to afford a more complete collapsing of the rim when the ends 14 and 16 of sections 18 and 20 respectively, heretofore referred to, are moved from the position of Fig. 3 to that of Fig. 4. One feature of the invention consists in the hinges applied at the points heretofore indicated, being so constructed that they can be made and applied to old or previously constructed rims with a minimum number of parts and labor. In the construction of these hinges, clearly shown in Fig. 5, each hinge comprises a relatively long flat bar member 24 secured to one rim section as 20 by suitable rivets or screws 26. The end of this bar 24, which is not so attached, extends over the line of juncture 28 between the adjacent rim sections and is provided with a Z shaped end 30 adapted to drop into, and so far as necessary, rotate in a rectangular slot 32 formed in the adjacent rim section. This Z-shaped member 30, forming the pivot of the hinge, is held in place for this hinge purpose by block 34 secured in place on its adjacent rim section by suitable screws or rivets 36. In the particular form of construction, shown in the drawings, member 24 lies between two parallel circumferential flanges 38 and 40, formed on the inner circumference of the rim. These flanges assist the hinge in holding the adjacent rim sections against lateral movement. In the particular form of construction, shown in the drawings, the Z-shaped pivotal portion 30 of the hinge is made of rectangular cross section, but this does not prevent proper rotary movement of the hinge because there is enough space provided between the walls of the Z-shaped pivot member 30 and the walls of the recess 32 to allow for the relatively small rotation of the adjacent rim sections 18 and 20 to enable them to move from the position of Fig. 3 to that of Fig. 4 and back again.

The mechanism for moving the adjacent rim sections, as shown in Figs. 3 and 4, comprises a lever 44 of a suitable width to completely occupy the width of the space between the flanges 38 and 40, heretofore described when the parts are in the position of Fig. 3, thus preventing sidewise movement of the parts along the juncture between the abutting ends 14 to 16. The lever substantially overlaps this line of juncture and one of its ends is pivoted by any suitable means in the opposite flanges 38 and 40, the particular means shown in the drawings being a rod or shaft 46 passing through the lever into the flanges.

The lever 44 is for strength generally straight, heavy and substantially unperforated, and is pivoted to the extreme end of the adjacent rim section in the particular case here illustrated 18, through the agency of a relatively short backbone or reinforcing block 50 rising from the body of the lever adapted to rotate and lie in a U-shaped notch 52 formed in the end of rim section 18, this block 50 being pivoted in the flanges 38 and 40 by a rod or shaft 54, clearly shown in the drawings. The remaining normally free end 58 of the lever 44 extends a substantial distance along the under surface of rim section 18 and is there detachably securable in position by any suitable means, as for instance, a rotatable button 60 manipulatable, for instance, by insertion of the screw driver in slot 62 provided for the purpose, between two positions, in one of which the lever is locked as shown in Fig. 2, and in the other of which it is free to move to the position of Fig. 4.

The lever 44 is further held in position with reference to the rim section, and the rim sections are therefore held against lateral movement through the agency of projecting lugs 64 and 65 carried by the lever and entering suitably formed recesses 66 and 67 provided for the purpose in the adjacent rim sections.

In the general operation of the device, the parts are assembled in the position shown in Figs. 1 and 2. The operator then takes a screw driver, inserts it in slot 62, turns button 60 to such a position that the lever 44 is released and then takes hold of the end 58 of the lever and swings the parts to the position of Fig. 4. The tire is now put on the rim in partially deflated condition and the movements, just described, are reversed. The air valve tube of the tire passes through the hole 70 provided for it, and after the rim is locked in normal position, air is pumped into the tire and it is ready for use.

The foregoing description does not refer to the locking bolt 70 and lock 72 therefor which is detachably insertible as shown to prevent the release of button 60 by a thief and the removal of the tire when the device is on the back of an automobile or otherwise removed from the wheel proper.

Having thus described my invention what I claim as new and desire to secure by Letters Patent is:

1. In mechanism of the class described, a pair of abutting rim sections, a lever on the under side of the rim overlapping the line of severance between said rim sections, a block rising from the middle portion of said lever reinforcing said lever and affording a pivotal connection between said lever and the end of one of the rim sections, means attaching one end of said lever to the other rim section at a point remote from said line of severance, positioning lugs on said lever at opposite sides of said block entering recesses in the respective rim sections, and means for securing the other end of the lever to the rim section to which it is pivoted at the center.

2. In mechanism of the class described, a pair of abutting rim sections, a lever on the under side of the rim overlapping the line of severance between said rim sections, a block rising from the middle portion of said lever reinforcing said lever and affording a pivotal connection between said lever and the end of one of the rim sections, means attaching one end of said lever to the other rim section at a point remote from said line of severance, positioning lugs on said lever at opposite sides of said block entering recesses in the respective rim sections, and means for securing the other end of the lever to the rim section to which it is pivoted at the center, the parts previously referred to being bordered and held in place by two parallel internal flanges on the rim sections.

In witness whereof, I have hereunto subscribed my name in the presence of two witnesses.

EUGENE A. JONES.

Witnesses:
F. E. COLLYER,
J. R. CLEAVELAND.